United States Patent
Del Sordo et al.

(10) Patent No.: US 10,169,025 B2
(45) Date of Patent: Jan. 1, 2019

(54) DYNAMIC MANAGEMENT OF SOFTWARE LOAD AT CUSTOMER PREMISE EQUIPMENT DEVICE

(71) Applicant: ARRIS Enterprises LLC, Suwanee, GA (US)

(72) Inventors: Christopher S. Del Sordo, Souderton, PA (US); Samuel Anthony Iacovera, Jr., San Diego, CA (US); Albert F. Elcock, West Chester, PA (US)

(73) Assignee: ARRIS Enterprises LLC, Suwanee, GA (US)

(*) Notice: Subject to any disclaimer, the term of this patent is extended or adjusted under 35 U.S.C. 154(b) by 44 days.

(21) Appl. No.: 15/362,386

(22) Filed: Nov. 28, 2016

(65) Prior Publication Data

US 2018/0150287 A1 May 31, 2018

(51) Int. Cl.
*G06F 9/445* (2018.01)
*G06F 8/61* (2018.01)
*G06F 8/36* (2018.01)

(52) U.S. Cl.
CPC ............. *G06F 8/62* (2013.01); *G06F 8/36* (2013.01); *G06F 9/44521* (2013.01); *G06F 8/61* (2013.01)

(58) Field of Classification Search
CPC .............. G06F 8/61; G06F 8/63; G06F 8/60
USPC ........................................................... 717/175
See application file for complete search history.

(56) References Cited

U.S. PATENT DOCUMENTS

| | | | |
|---|---|---|---|
| 2006/0031664 A1* | 2/2006 | Wilson | G06F 8/65 713/1 |
| 2009/0144490 A1* | 6/2009 | Sridhar | G06F 5/10 711/104 |
| 2013/0124751 A1* | 5/2013 | Ando | G11B 27/105 709/233 |
| 2016/0301559 A1* | 10/2016 | McAlister | H04L 41/042 |
| 2016/0306624 A1* | 10/2016 | Vangelov | G06F 8/654 |
| 2017/0060772 A1* | 3/2017 | Krishnappa | G06F 12/12 |

* cited by examiner

*Primary Examiner* — John Q Chavis
(74) *Attorney, Agent, or Firm* — Bart A. Perkins

(57) ABSTRACT

Methods, systems, and computer readable media can be operable to facilitate the dynamic management of the software load at a customer premise equipment device. Software components may be dynamically loaded into volatile memory of a customer premise equipment (CPE) device from a download server or non-volatile memory of the CPE device when an interaction with the CPE device creates a request for the software components. The CPE device may be configured to dynamically unload software components from volatile memory to create space for an incoming software component. The CPE device may identify one or more software components to be removed from volatile memory based upon a calculated probability to unload value for the software components within volatile memory, wherein the probability to unload value for each of the software components is calculated based upon one or more criteria associated with each software component.

20 Claims, 7 Drawing Sheets

DYNAMIC MANAGEMENT OF SOFTWARE LOAD AT CUSTOMER PREMISE EQUIPMENT DEVICE

TECHNICAL FIELD

This disclosure relates to dynamically managing the software load at a customer premise equipment device.

BACKGROUND

Customer premise equipment (CPE) devices such as set top boxes (STBs) and others typically require complex software programs that are increasing in size due to the many features that need to be supported at the devices. These software programs may incorporate the use of open source software which generally increases the amount of software space/memory which the device needs to access. Typically, an entire build image is downloaded and stored in resident memory of a CPE device, which results in increased cost for both volatile and non-volatile memory footprint. This cost is a significant contributing factor to the overall cost of a device. Therefore, a need exists for improving methods and systems for loading and unloading software components to and from volatile memory and non-volatile memory.

BRIEF DESCRIPTION OF THE DRAWINGS

Like reference numbers and designations in the various drawings indicate like elements.

DETAILED DESCRIPTION

Figure 1:
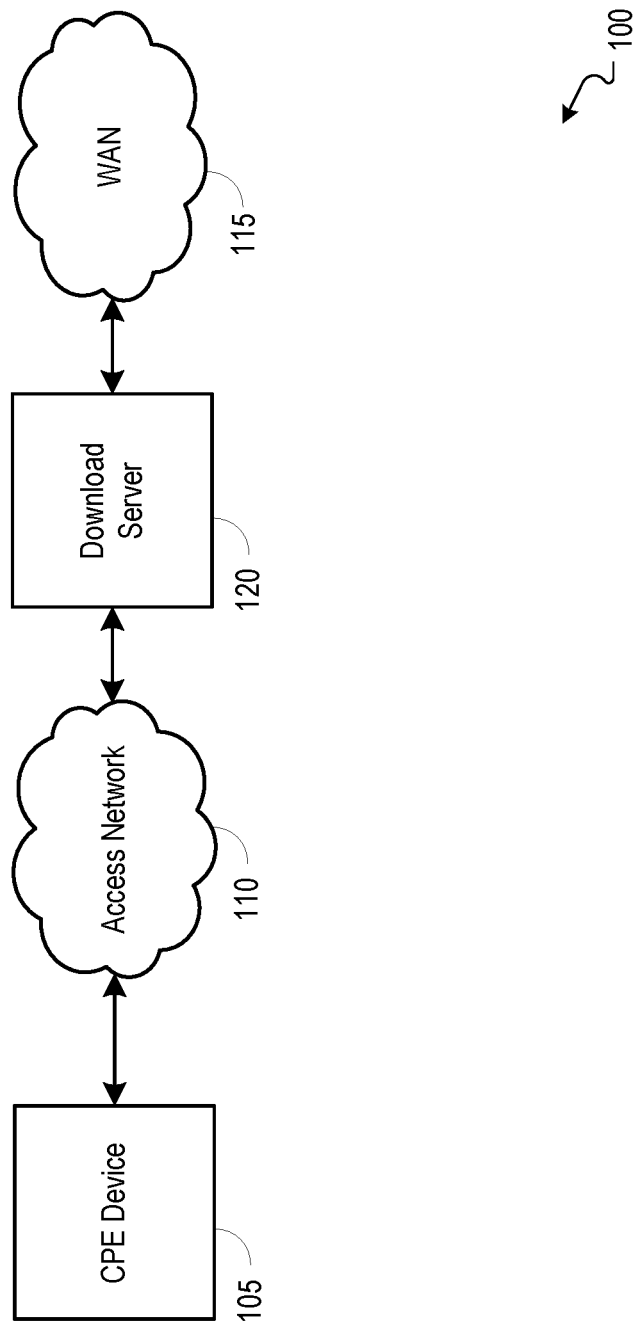
FIG. 1 is a block diagram illustrating an example network environment operable to facilitate the dynamic management of the software load at a customer premise equipment device.

It is desirable to improve upon methods and systems for loading and unloading software components to and from volatile memory. Methods, systems, and computer readable media can be operable to facilitate the dynamic management of the software load at a customer premise equipment device. Software components may be dynamically loaded into volatile memory of a customer premise equipment (CPE) device from a download server or from non-volatile memory of the CPE device when an interaction with the CPE device creates a request for the software components. The CPE device may be configured to dynamically unload software components from volatile memory to create space for an incoming software component. The CPE device may identify one or more software components to be removed from volatile memory based upon a calculated probability to unload value for the software components within volatile memory, wherein the probability to unload value for each of the software components is calculated based upon one or more criteria associated with each software component.

An embodiment of the invention described herein may include a method comprising: (a) detecting a request to load a requested software component to volatile memory; (b) determining that the size of the requested software component is greater than the size of available space in the volatile memory; (c) determining a probability to unload value for each software component of one or more software components currently loaded in the volatile memory, wherein the probability to unload value for each respective one software component is calculated based upon one or more criteria associated with the respective one software component; (d) based upon the probability to unload values determined for each of the one or more software components that are currently loaded in the volatile memory, identifying one or more of the software components for removal from the volatile memory; (e) removing the identified one or more software components from the volatile memory; and (f) loading the requested software component to the volatile memory.

According to an embodiment of the invention, the requested software component is loaded into the volatile memory from non-volatile memory.

According to an embodiment of the invention, the requested software component is loaded into the volatile memory from a download server.

According to an embodiment of the invention, the method described herein further comprises, before identifying one or more of the software components for removal from the volatile memory based upon the probability to unload values, removing one or more software components associated with a disabled feature from the volatile memory.

According to an embodiment of the invention, the method described herein further comprises, determining an amount of available network bandwidth, wherein the available network bandwidth is used in the identification of the one or more software components for removal from the volatile memory.

According to an embodiment of the invention, the one or more software components identified for removal from the volatile memory comprise one or more software components having the highest probability to unload values relative to the probability to unload values of the other software components loaded in the volatile memory.

According to an embodiment of the invention, the requested software component is loaded into the volatile memory from non-volatile memory when a required latency associated with the requested software component is less than a threshold latency, and the requested software component is loaded into the volatile memory from a download server when the required latency associated with the requested software component is greater than the threshold latency.

According to an embodiment of the invention, the one or more criteria associated with the respective one software component is downloaded as part of a software component database comprising one or more criteria associated with each of one or more software components.

According to an embodiment of the invention, one or more of the criteria within the software component database is periodically updated.

An embodiment of the invention described herein may include, an apparatus comprising one or more modules configured to: (a) detect a request to load a requested software component to volatile memory; (b) determine that the size of the requested software component is greater than the size of available space in the volatile memory; (c) determine a probability to unload value for each software component of one or more software components currently loaded in the volatile memory, wherein the probability to unload value for each respective one software component is calculated based upon one or more criteria associated with the respective one software component; (d) based upon the probability to unload values determined for each of the one or more software components that are currently loaded in the volatile memory, identify one or more of the software components for removal from the volatile memory; (e) remove the identified one or more software components from the volatile memory; and (f) load the requested software component to the volatile memory.

An embodiment of the invention described herein may include, one or more non-transitory computer readable media having instructions operable to cause one or more processors to perform the operations comprising: (a) detecting a request to load a requested software component to volatile memory; (b) determining that the size of the requested software component is greater than the size of available space in the volatile memory; (c) determining a probability to unload value for each software component of one or more software components currently loaded in the volatile memory, wherein the probability to unload value for each respective one software component is calculated based upon one or more criteria associated with the respective one software component; (d) based upon the probability to unload values determined for each of the one or more software components that are currently loaded in the volatile memory, identifying one or more of the software components for removal from the volatile memory; (e) removing the identified one or more software components from the volatile memory; and (f) loading the requested software component to the volatile memory.

According to an embodiment of the invention, the instructions are further operable to cause the one or more processors to perform the operations comprising, before identifying one or more of the software components for removal from the volatile memory based upon the probability to unload values, removing one or more software components associated with a disabled feature from the volatile memory.

According to an embodiment of the invention, the instructions are further operable to cause the one or more processors to perform the operations comprising, determining an amount of available network bandwidth, wherein the available network bandwidth is used in the identification of the one or more software components for removal from the volatile memory.

FIG. 1 is a block diagram illustrating an example network environment 100 operable to facilitate the dynamic management of the software load at a customer premise equipment device. In embodiments, a customer premise equipment (CPE) device 105 may receive and/or deliver one or more services (e.g., video, data, voice, security, and/or other service(s)) to a subscriber. The CPE device 105 may include a set-top box (STB), multimedia gateway device, modem, router, wireless extender, and/or any other device configured to receive and/or deliver a service to a subscriber.

In embodiments, the CPE device 105 may receive the one or more services and may transmit and receive other communications to and from one or more upstream network components through an access network 110 and a wide-area network (WAN) 115. The access network 110 may include any of a variety of communication links between the CPE device 105 and a WAN 115, such as a hybrid-fiber coaxial (HFC) network, phone line(s) connected to a digital subscriber line access multiplexer (DSLAM), wireless communication network, and others.

In embodiments, the CPE device 105 may be configured to dynamically load components of software into non-volatile memory from a download server 120 based on hardware configuration and/or software features that are enabled at the CPE device 105 at any given time. The CPE device 105 may be configured to determine one or more software components to be loaded by processing the CPE device configuration before downloading software components each time that a software download occurs at the CPE device 105. For example, the CPE device configuration may be derived from a factory/hardware configuration of the device, and the software components identified for loading may include those software components that support the hardware of the CPE device 105 on which software is being executed. The CPE device 105 may determine and account for any application/user configurations or any headend configuration that may have occurred, and the software components identified for loading may include those software components that support the configurations. The CPE device 105 may maintain a list of software components during runtime operation.

In embodiments, the CPE device 105 may be configured to dynamically load or unload software components to or from non-volatile memory during runtime operation when the configuration of the CPE device 105 changes. For example, the CPE device 105 may load a specific software component (e.g., purchasing software component, etc.) of a software image to non-volatile memory when a corresponding feature (e.g., program purchase feature) is enabled at the CPE device 105. The CPE device 105 may be configured to unload a specific software component (e.g., purchasing software component, etc.) of a software image from non-volatile memory when a corresponding feature (e.g., program purchase feature) is disabled at the CPE device 105. The downloadable image may identify an association between configuration or feature elements and one or more software components, and the CPE device 105 may utilize the associations within the downloadable image to load one or more software components that are associated with a configuration of the CPE device 105 or a feature that is enabled at the CPE device 105.

In embodiments, the CPE device 105 may be configured to dynamically load and/or unload software components between non-volatile memory and volatile memory, wherein the software components may be executed from volatile memory. The CPE device 105 may load software components from non-volatile memory to volatile memory based on requests for functionality that come from interactions with the CPE device 105. Interactions with the CPE device 105 may include commands received from a user controlling or interfacing with the CPE device 105, communications received from other devices (e.g., other CPE devices, client devices such as tablets, computers, mobile devices, etc.) through a network connection, and others. As an example, a purchasing software component may be loaded from non-volatile memory to volatile memory when a user issues a request to purchase a program. As another example, an HLS (HTTP live streaming) server software component may be loaded from non-volatile memory to volatile memory when a request to stream HLS content to a remote device is received at the CPE device 105.

The CPE device 105 may be configured to retain certain software components within non-volatile or volatile memory so that the certain software components are ready for execution. For example, kernel, often-executed software components (e.g., software components that are expected to or that are observed to be commonly executed), and software components that are used to identify and access individual software components may be continuously retained within non-volatile or volatile memory, thereby limiting network bandwidth usage.

In embodiments, the CPE device 105 may be configured to dynamically download software components from a download server 120 over an access network 110 as the software components are needed during runtime execution. Software components may be dynamically loaded directly from the download server 120 to the software execution cache where the software components are ready to be executed. The dynamic loading of software components from the download server 120 to the software execution cache may occur without issuing a platform reset or interrupting software runtime execution after these modules are successfully loaded. The CPE device 105 may maintain a continuous connection with the download server 120 and may load software components directly from the download server 120 to volatile memory of the CPE device 105. The CPE device 105 may determine the available network bandwidth and may use the available network bandwidth as an input parameter in the decision logic used for loading and unloading software components from volatile memory.

A non-volatile memory software object may provide the core operating environment which includes the software component loader module functionality. A version of this software object may be placed in non-volatile memory and may be upgraded via a configuration download scheme. During initialization, this operating environment and software component loader may be placed into the software execution cache and remain in the software execution cache during operation. After initialization, the software component loader module may create a connection to the download server 120 and may maintain a continuous connection with the download server 120 throughout the software execution. In embodiments, when a feature is disabled at the CPE device 105, the CPE device 105 may identify and unload from non-volatile memory, one or more software components that are associated with the disabled feature.

In embodiments, the download server 120 may include a repository of the software components that may be loaded during runtime execution for the CPE device 105. A messaging protocol may be used between the download server 120 and the software component loader executing at the CPE device 105 to request loading of software components. The software components may be loaded into volatile memory (e.g., a software execution cache such as RAM (random-access memory) disk) from which the operating system of the CPE device 105 can load pages to the instruction/data caches of a CPU (central processing unit). It should be understood that the download server 120 may be located within a headend or may be located at an upstream network (e.g., WAN 115). The CPE device 105 may download the software components from the download server 120 as a download that includes code that is broken up into feature-based loadable units (i.e., the software components) and a software component database that includes predefined attributes associated with each of the loadable units. The predefined attributes may be used by the CPE device 105 to determine a probability to unload value for the associated software component. The attributes within the software component database may be periodically updated to reflect changes to the attributes (e.g., frequency at which the component is run, time since the component was last run, etc.).

The CPE device 105 may determine that a software component should be unloaded from volatile memory when there is not enough room in volatile memory (e.g., the software execution cache) to support the loading of a requested software component into volatile memory. When the CPE device 105 determines that a software component should be unloaded from volatile memory in order to create space for a requested software component to be loaded into volatile memory, the CPE device 105 may determine whether any of the software components loaded into volatile memory are associated with a feature that is disabled. If the CPE device 105 determines that one or more software components loaded into volatile memory are associated with a disabled feature, the CPE device 105 may unload the one or more software components from volatile memory before the unloading algorithm is executed.

The CPE device 105 may be configured with an unload algorithm that is used to determine when software components are to be unloaded from memory. It takes time to load a software component from non-volatile memory to volatile memory. By dynamically unloading software components from volatile memory, the CPE device 105 may efficiently utilize the volatile memory with most recently requested software that needs to be executed. The unload algorithm may incorporate several input parameters to make a decision on when and if certain software components are to be unloaded from volatile memory. The CPE device 105 may unload software components from volatile memory (e.g., a software execution cache) based on the unload algorithm analysis of one or more criteria associated with the software components that are loaded in the volatile memory. Once a software component is loaded into volatile memory, strategic information associated with the software component may be maintained. This strategic information that is maintained for each module may be used at a later time to determine when software module(s) should be unloaded. The unloading algorithm may iteratively run and update the strategic information associated with software components loaded in the volatile memory. In response to an interaction causing the loading of a software component that is not currently loaded into volatile memory, the CPE device 105 may execute the unloading algorithm and process the currently loaded software component information to determine which software component(s) to unload from volatile memory when there is not enough room in volatile memory to support the loading of the requested software component.

In embodiments, the CPE device 105 may determine a probability to unload value for each software component that is currently loaded in volatile memory. The probability to unload value may be used by the CPE device 105 to decide which software component(s) should be unloaded when an interaction requires a software component to be loaded into volatile memory and the size of available software execution cache (e.g., available space in volatile memory) is less than the size of the software component that is to be loaded. The size of the available software execution cache may be recalculated by the CPE device 105 each time a software component is loaded or unloaded to or from volatile memory. The available software execution cache may be based on the maximum size of the software execution cache minus the sizes of all software components that are loaded into the software execution cache.

In embodiments, one or more criteria associated with a software component may be downloaded to the CPE device 105 along with the download of the software component. For example, when a software component is downloaded to the CPE device 105 from a download server 120, a database that includes the one or more criteria of the software component (e.g., frequency at which the software component is executed, time required by the software component to begin executing, size of the software component, time since the software component was last requested/loaded, and/or others) may be downloaded along with or separately from the software component.

In determining the probability to unload value for a software component, the CPE device 105 may consider the size of available software execution cache, current network bandwidth, and one or more criteria associated with the software component including a frequency at which the software component is executed, time required by the software component to begin executing, size of the software component, time since the software component was last requested/loaded, and/or others. The CPE device 105 may ignore the current network bandwidth (e.g., available bandwidth for communications to be passed between the CPE device 105 and download server 120 over the access network 110 or other network) when loading a software component from non-volatile memory to volatile memory. When the software component is to be loaded directly from the download server 120 to volatile memory, the CPE device 105 may consider the current network bandwidth in the determination of the probability to unload for one or more software components.

The CPE device 105 may use the calculated probability to unload for each currently loaded software component to determine which software component(s) should be unloaded from volatile memory. It should be understood, that the unload algorithm may be configured in various ways to dynamically consider and weigh the different criteria used in the calculation of the probability to unload for the different software components. As an example, if a currently loaded software component has a low statistical software execution frequency and a long time required to begin execution, the unload algorithm may be configured to produce a high probability to unload for the software component. As another example, if a software component has not been requested or loaded in a long time, the unload algorithm may be configured to produce a high probability to unload for the software component. In embodiments, the unload algorithm with which the CPE device 105 is configured may produce a determination to unload a larger software component if the CPE device 105 determines that the available bandwidth is greater than a certain threshold, whereas, if the CPE device 105 determines that the available bandwidth is less than a certain threshold, the unload algorithm may produce a determination to unload multiple smaller software components.

In embodiments, the CPE device 105 may be configured to load certain software components from a download server 120 to non-volatile memory before loading the software components into volatile memory for execution and to load other software components directly into volatile memory from the download server 120. The CPE device 105 may load software components from the download server 120 to non-volatile memory of the CPE device 105 when the determination is made that the software components need to be loaded into volatile memory for execution quickly. For software components that do not need to be loaded into volatile memory for execution quickly, the CPE device 105 may load the software components directly into volatile memory from the download server 120. For example, the CPE device 105 may load software components from the download server 120 into non-volatile memory when a latency issue or requirement associated with the software components preclude the software components from being loaded directly into volatile memory.

Figure 2:
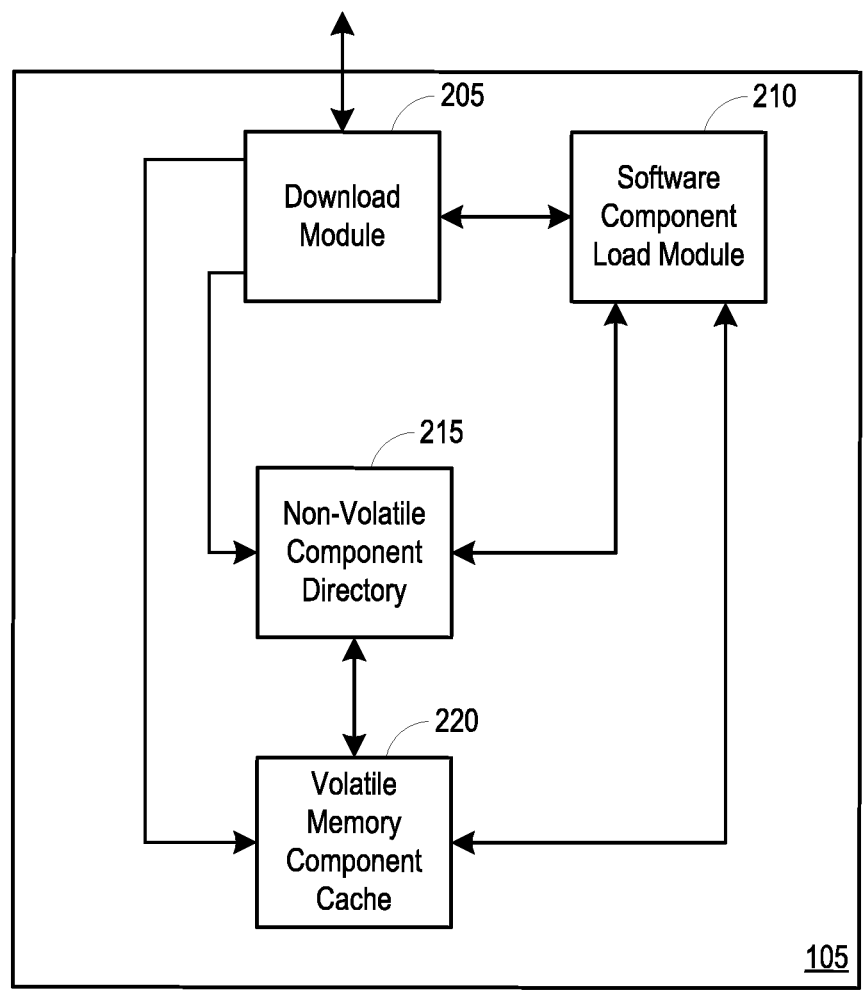
FIG. 2 is a block diagram illustrating an example customer premise equipment device operable to facilitate the dynamic management of the software load at the customer premise equipment device.

FIG. 2 is a block diagram illustrating an example CPE device 105 operable to facilitate the dynamic management of the software load at the CPE device 105. In embodiments, the CPE device 105 may include a download module 205, a software component load module 210, a non-volatile component directory 215, and a volatile memory component cache 220.

In embodiments, the download module 205 may download software components from an upstream network element or server (e.g., download server 120 of FIG. 1) and may load the downloaded software components into non-volatile memory (e.g., non-volatile component directory 215) or volatile memory (e.g., volatile memory component cache 220). The software component load module 210 may provide support to load and unload software components to and from the non-volatile component directory 215 and volatile memory component cache 220. For example, the software component load module 210 may initiate a download of a software component from a download server 120 via the download module 205 or may initiate a loading of a software component from the non-volatile component directory 215 to the volatile memory component cache 220 based on a recognition of requests for functionality that come from interactions with the CPE device 105. Interactions with the CPE device 105 may include a command or communication received from a user or other device (e.g., other CPE devices, client devices such as tablets, computers, mobile devices, etc.) communicating with the CPE device 105 via a network connection or other communication link (e.g., WLAN (wireless local area network), Bluetooth, NFC (near field communication), etc.). As an example, if a purchasing software component module was not already loaded in the volatile memory component cache 220 when a request to purchase a program is received at the CPE device 105, the software component load module 210 may load the purchasing module from the non-volatile component directory 215 to the volatile memory component cache 220 or directly from the download server 120 to the volatile memory component cache 220. In embodiments, the download module 205 may maintain a continuous connection with a download server 120 and may load software components directly from the download server 120 to the volatile memory component cache 220.

The software component load module 210 may identify and load certain software components to non-volatile memory (e.g., non-volatile component directory 215), for example, from a download server (e.g., download server 120). In embodiments, the software component load module 210 may identify, for loading into non-volatile memory, software components that are associated with a feature that is enabled at the CPE device 105 and/or software components that are continuously or frequently needed or run at the CPE device 105. The software component load module 210 may identify these specific software components based upon one or more criteria associated with the software components (e.g., criteria stored in a software component database that is downloaded to the CPE device 105).

The software component load module 210 may be configured to recognize software components for loading to the volatile memory component cache 220 based on associations between the software components and functions or features that may be requested for enabling or execution at the CPE device 105. For example, the software component load module 210 may recognize software components for loading/unloading based upon information found in a software component database that is downloaded with the software component itself. The software component load module 210 may process the software component database. The platform software target may be broken up into appropriate loadable units (i.e., software components) which are designed around functionality associated with interactions with the CPE device 105, and the software component database may define the loadable units and where they are located in the download stream. The software component load module 210 may detect an interaction and may determine a software component that is associated with the interaction. The software component load module 210 may check whether the software component is already loaded in the volatile memory component cache 220, and may queue the requests associated with the interaction until the software component is loaded into the volatile memory component cache 220.

In embodiments, the software component load module 210 may determine that a software component should be unloaded form the volatile memory component cache 220 when there is not enough room in volatile memory to support the loading of a requested software component into volatile memory. When the software component load module 210 determines that a software component should be unloaded from the volatile memory component cache 220 in order to create space for a requested software component, the software component load module 210 may determine whether any of the software components loaded into the volatile memory component cache 220 are associated with a feature that is disabled. If the software component load module 210 determines that one or more software components loaded into the volatile memory component cache 220 are associated with a disabled feature, the software component load module 210 may unload the one or more software components from the volatile memory component cache 220 before an unloading algorithm is executed.

The software component load module 210 may be configured with an unload algorithm that is used to determine when and which software components are to be unloaded from the volatile memory component cache 220. The unload algorithm may incorporate several input parameters to make a decision on when and which software components are to be unloaded from volatile memory. Once a software component is loaded into the volatile memory component cache 220, strategic information associated with the software component may be maintained. For example, at the software component load module 210, the unloading algorithm may iteratively run and update the strategic information associated with software components loaded in the volatile memory component cache 220. When an interaction detected by the software component load module 210 initiates a request for the loading of a software component into volatile memory and there is not enough room in the volatile memory to support the loading of the software component, the software component load module 210 may execute the unloading algorithm and process the currently loaded software component information to determine which software component(s) to unload from volatile memory.

The strategic information associated with a software component may include a frequency at which the software component is executed. For example, a software execution frequency tag may be associated with each software component. The software execution frequency tag may be assigned to an associated software component during build time. The software execution frequency tag may provide an indication as to how frequently the software component is executed. For example, the software execution frequency tag may indicate that the associated software component is continuously executed (i.e., the software component, such as a kernel module, is continuously executed due to requests/interactions, thus the software component should not be considered for unloading when possible), rarely executed (i.e., the software component, such as a parental control functionality, is rarely executed due to requests/interactions), or is often executed (i.e., the software component, such as a tune channel functionality, is often executed due to requests/interactions).

The strategic information associated with a software component may include a speed at which execution of the software component may be started. For example, a software execution start speed tag may be associated with each software component. The software execution start speed tag may be assigned to an associated software component during build time. The software execution start speed tag may provide an indication as to how quickly the software component needs to begin execution after a request for the software component is made. For example, the software execution start speed tag may indicate that the software component requires a fast start execution speed (e.g., a service acquisition module might require a fast start execution speed), that the software component needs a medium start execution speed, or that a slow start execution speed is sufficient for the loading of the software component (e.g., a parental control module might only require a slow start execution speed).

The strategic information associated with a software component may include a size of the software component. In embodiments, the decompressed size of the software component may be maintained for each software component that is currently loaded in the volatile memory component cache 220. Size information may be generated or retrieved for software components that are currently not loaded but have been requested to be loaded due to an interaction with the CPE device 105.

The strategic information associated with a software component may include an indication of the amount of time since the software component was last loaded. In embodiments, the software component load module 210 may iteratively wake up and increment the time since last loaded for each software component module that is loaded in the volatile memory component cache 220. The time since a software component was last loaded may be used along with the software execution frequency categorization of the software component in determining a probability to unload value for the software component.

It should be understood that the strategic information associated with a software component may include other information as well. For example, the strategic information may include any information that may be relevant to a determination whether to unload an associated software component.

In embodiments, the software component load module 210 may iteratively wake up and calculate a probability to unload value for each software component that is currently loaded in the volatile memory component cache 220. The software component load module 210 may use the probability to unload values of the software components to determine which software components should be unloaded when an interaction/request requires a software component to be loaded into the volatile memory component cache 220 and the size of the available software execution cache is less than the size of the software component to be loaded. The size of the available software execution cache may be recalculated each time a software component is loaded or unloaded. The value calculated as the size of the available software execution cache may be based on the maximum size of the software execution cache minus the sizes of the currently loaded software components. The software component load module 210 may calculate a probability to unload value for a software component using the strategic information associated with the software component (e.g., size of available software execution cache, software execution frequency, current network bandwidth, time since last load, size of component, and others). The software component load module 210 may ignore the current network bandwidth (e.g., available bandwidth for communications to be passed between the CPE device 105 and download server 120 over the access network 110 of FIG. 1 or other network) when loading a software component from the non-volatile component directory 215 to the volatile memory component cache 220. It should be understood, that the software component load module 210 may be configured to dynamically consider and weigh the different strategic information values used in the calculation of the probability to unload values. When the software component is to be loaded directly from the download server 120 to the volatile memory component cache 220, the software component load module 210 may consider the current network bandwidth in the determination of the probability to unload for one or more software components.

In embodiments, the software component load module 210 may be configured to load certain software components from a download server 120 to the non-volatile component directory 215 before loading the software components into the volatile memory component cache 220 for execution and to load other software components directly into the volatile memory component cache 220 from the download server 120. The software component load module 210 may load software components from the download server 120 to the non-volatile component directory 215 when the determination is made that the software components need to be loaded into volatile memory for execution quickly. For software components that do not need to be loaded into volatile memory for execution quickly, the software component load module 210 may load the software components directly into the volatile memory component cache 220 from the download server 120. For example, the software component load module 210 may load software components from the download server 120 into the non-volatile component directory 215 when a latency issue or requirement associated with the software components preclude the software components from being loaded directly into the volatile memory component cache 220.

Figure 3:
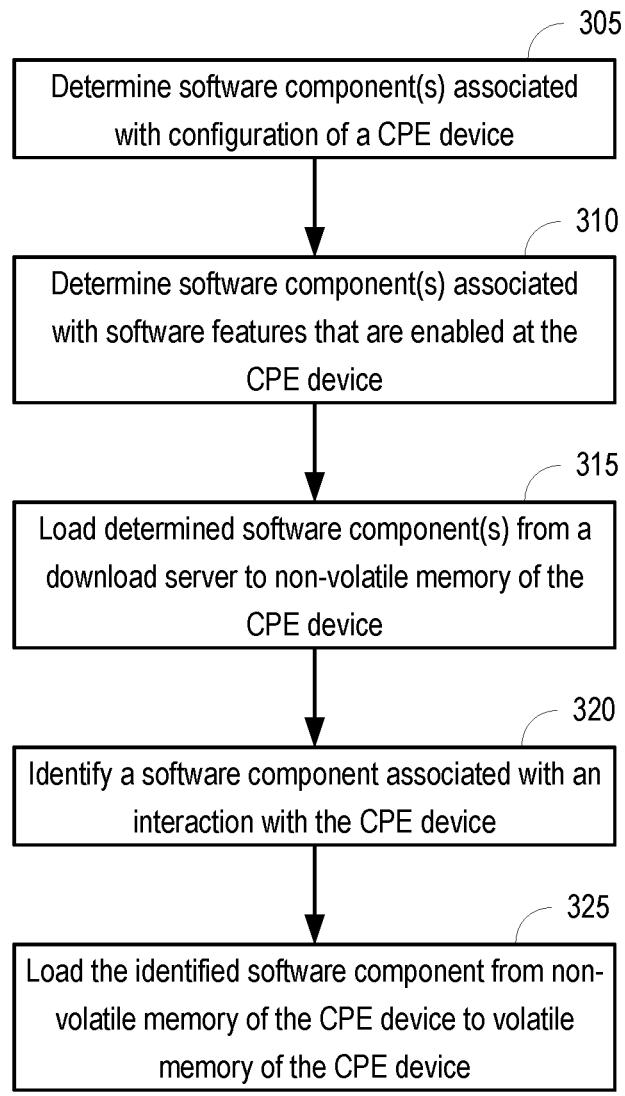
FIG. 3 is a flowchart illustrating an example process operable to facilitate the dynamic loading of software components from non-volatile memory to volatile memory of a customer premise equipment device.

FIG. 3 is a flowchart illustrating an example process 300 operable to facilitate the dynamic loading of software components from non-volatile memory to volatile memory of a CPE device. The process 300 can begin at 305 where one or more software components associated with a configuration of a CPE device are determined. The one or more software components associated with the configuration of the CPE device (e.g., CPE device 105 of FIG. 1) may be determined, for example, by the software component load module 210 of FIG. 2. The software component load module 210 may determine one or more software components to be loaded by processing the CPE device configuration before downloading software components each time that a software download occurs at the CPE device. For example, the CPE device configuration may be derived from a factory/hardware configuration of the device, and the software components identified for loading may include those software components that support the hardware of the CPE device on which software is being executed. The software component load module 210 may determine and account for any application/user configurations or any headend configuration that may have occurred, and the software components identified for loading may include those software components that support the configurations.

At 310, one or more software components associated with software features that are enabled at the CPE device may be determined. The one or more software components associated with the enabled features may be determined, for example, by the software component load module 210 of FIG. 2. In embodiments, the software component load module 210 may identify one or more features that are enabled at the CPE device and may identify one or more software components that are associated with the enabled features. The software component load module 210 may maintain (e.g., via a downloadable image) associations between feature elements and software components.

At 315, the one or more determined software components (i.e., the software components determined at 305 and 310) may be loaded from a download server to non-volatile memory of the CPE device. For example, the one or more software components determined by the software component load module 210 may be loaded into the non-volatile component directory 215 of the CPE device 105 from a download server (e.g., download server 120 of FIG. 1).

At 320, one or more software components associated with an interaction with the CPE device may be identified. The one or more software components associated with an interaction with the CPE device may be identified, for example, by the software component load module 210. In embodiments, the software component load module 210 may detect an interaction with the CPE device and may identify one or more software components that are needed by the CPE device to respond to the interaction. Interactions with the CPE device may include commands received from a user controlling or interfacing with the CPE device, communications received from other devices (e.g., other CPE devices, client devices such as tablets, computers, mobile devices, etc.) through a network connection, and others.

At 325, the identified software component(s) may be loaded from non-volatile memory of the CPE device to volatile memory of the CPE device. The identified software component(s) may be loaded from non-volatile memory (e.g., non-volatile component directory 215 of FIG. 2) to volatile memory (e.g., volatile memory component cache 220 of FIG. 2), for example, by the software component load module 210. In embodiments, the software component load module 210 can direct the loading of the identified software component(s) into volatile memory from non-volatile memory, wherein the CPE device may execute the software component(s) from the volatile memory.

Figure 4:
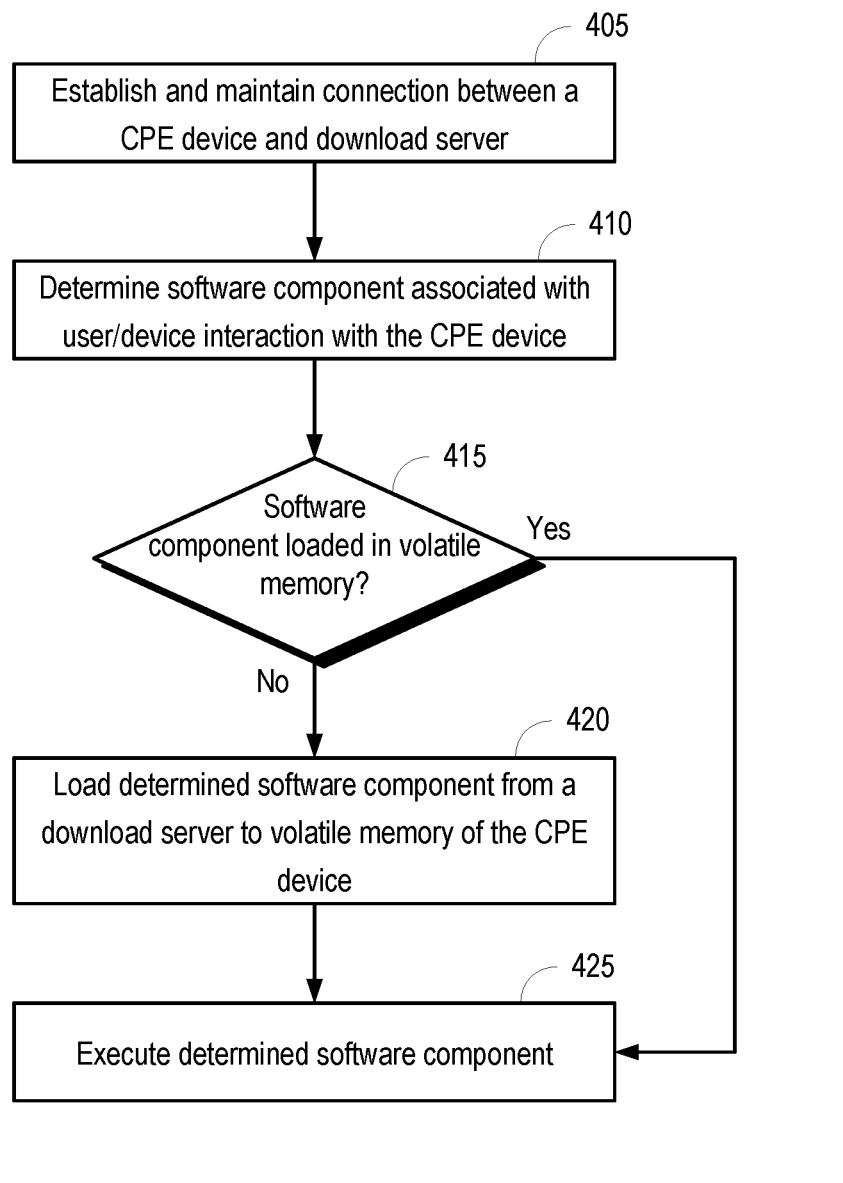
FIG. 4 is a flowchart illustrating an example process operable to facilitate the dynamic loading of software components directly from a download server to volatile memory of a customer premise equipment device.

FIG. 4 is a flowchart illustrating an example process 400 operable to facilitate the dynamic loading of software components directly from a download server to volatile memory of a CPE device. The process 400 can begin at 405 where a connection between a CPE device and a download server is established and maintained. The connection between the CPE device (e.g., CPE device 105 of FIG. 1) and download server (e.g., download server 120 of FIG. 1) may be established and maintained, for example, by the download module 205 of FIG. 2. In embodiments, the download server 120 may include a repository of the software components that may be loaded during runtime execution for the CPE device 105. A messaging protocol may be used between the download server 120 and a software component loader (e.g., software component load module 210 of FIG. 2) executing at the CPE device 105 to request loading of software components.

At 410, one or more software components associated with an interaction with the CPE device may be identified. The one or more software components associated with an interaction with the CPE device may be identified, for example, by the software component load module 210. In embodiments, the software component load module 210 may detect an interaction with the CPE device and may identify one or more software components that are needed by the CPE device to respond to the interaction. Interactions with the CPE device may include commands received from a user controlling or interfacing with the CPE device, communications received from other devices (e.g., other CPE devices, client devices such as tablets, computers, mobile devices, etc.) through a network connection, and others.

At 415, a determination may be made whether the determined software component is loaded in volatile memory of the CPE device. The determination whether the determined software component is loaded in volatile memory of the CPE device may be made, for example, by the software component load module 210. In embodiments, the software component load module 210 may check the volatile memory component cache 220 for the determined software component.

If, at 415, the determination is made that the software component (e.g., the software component determined at 410) is not loaded in volatile memory, the process 400 may proceed to 420. At 420, the determined software component may be loaded from a download server to volatile memory of the CPE device. For example, the determined software component may be loaded into the volatile memory component cache 220 of the CPE device 105 from a download server (e.g., download server 120 of FIG. 1). Once the software component is loaded into volatile memory, the CPE device may execute the software component from volatile memory at 425.

If, at 415, the determination is made that the software component (e.g., the software component determined at 410) is loaded in volatile memory (e.g., volatile memory component cache 220 of the CPE device 105), the CPE device may execute the software component from volatile memory at 425.

Figure 5:
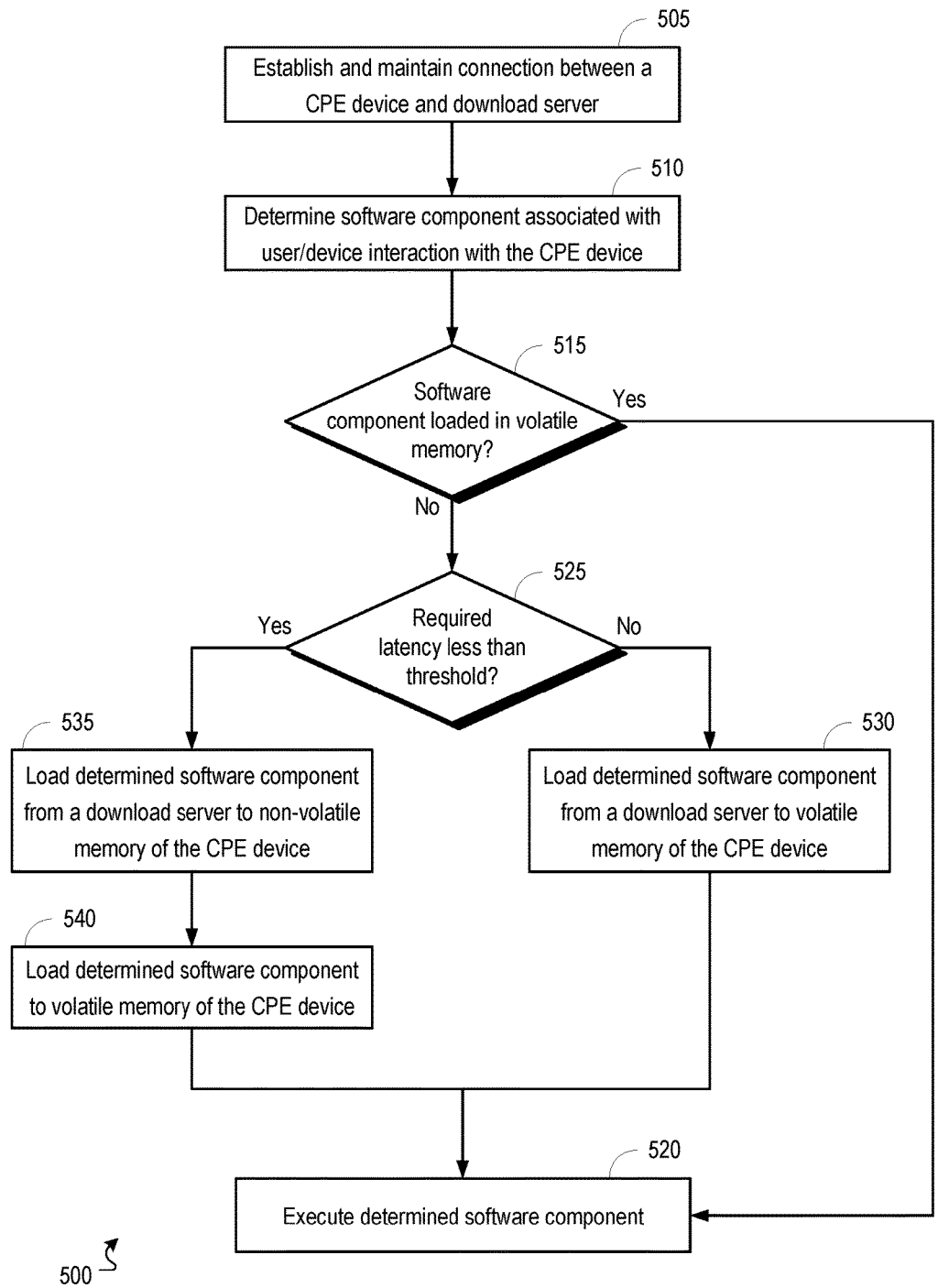
FIG. 5 is a flowchart illustrating an example process operable to facilitate the dynamic loading of software components from a download server to non-volatile memory or volatile memory of a customer premise equipment device based on latency requirements of the software components.

FIG. 5 is a flowchart illustrating an example process 500 operable to facilitate the dynamic loading of software components from a download server to non-volatile memory or volatile memory of a CPE device based on latency requirements of the software components. The process 500 can begin at 505 where a connection between a CPE device and a download server is established and maintained. The connection between the CPE device (e.g., CPE device 105 of FIG. 1) and download server (e.g., download server 120 of FIG. 1) may be established and maintained, for example, by the download module 205 of FIG. 2. In embodiments, the download server 120 may include a repository of the software components that may be loaded during runtime execution for the CPE device 105. A messaging protocol may be used between the download server 120 and a software component loader (e.g., software component load module 210 of FIG. 2) executing at the CPE device 105 to request loading of software components.

At 510, one or more software components associated with an interaction with the CPE device may be identified. The one or more software components associated with an interaction with the CPE device may be identified, for example, by the software component load module 210. In embodiments, the software component load module 210 may detect an interaction with the CPE device and may identify one or more software components that are needed by the CPE device to respond to the interaction. Interactions with the CPE device may include commands received from a user controlling or interfacing with the CPE device, communications received from other devices (e.g., other CPE devices, client devices such as tablets, computers, mobile devices, etc.) through a network connection, and others.

At 515, a determination may be made whether the determined software component is loaded in volatile memory of the CPE device. The determination whether the determined software component is loaded in volatile memory of the CPE device may be made, for example, by the software component load module 210. In embodiments, the software component load module 210 may check the volatile memory component cache 220 for the determined software component. If the determination is made that the software component (e.g., the software component determined at 510) is loaded in volatile memory (e.g., volatile memory component cache 220 of the CPE device 105), the CPE device may execute the software component from volatile memory at 520.

If, at 515, the determination is made that the software component (e.g., the software component determined at 510) is not loaded in volatile memory, the process 500 may proceed to 525. At 525, a determination may be made whether a required latency associated with the software component is less than a threshold latency. The determination whether the required latency associated with the software component is less than a threshold latency may be made, for example, by the software component load module 210. In embodiments, the software component may be associated with a certain latency requirement. For example, the software component or software feature associated with the software component may require that the software component be executed within a certain amount of time from the time at which execution of the component is requested. The software component load module 210 may identify the latency required by the software component and may compare the required latency to a threshold latency. The threshold latency may include a predetermined latency threshold or a latency that is available to the CPE device 105 for receiving communications from the download server 120.

If, at 525, the determination is made that the required latency associated with the software component is not less than a threshold latency, the process 500 may proceed to 530. At 530, the determined software component may be loaded from a download server to volatile memory of the CPE device. For example, the determined software component may be loaded into the volatile memory component cache 220 of the CPE device 105 directly from a download server (e.g., download server 120 of FIG. 1) (i.e., the software component may be downloaded into the volatile memory component cache 220 without being first loaded into non-volatile memory). Once the software component is loaded into volatile memory, the CPE device may execute the software component from volatile memory at 520.

If, at 525, the determination is made that the required latency associated with the software component is less than a threshold latency, the process 500 may proceed to 535. At 535, the determined software component may be loaded from a download server to non-volatile memory of the CPE device. For example, the software component may be loaded into the non-volatile component directory 215 of the CPE device 105 from a download server (e.g., download server 120 of FIG. 1).

At 540, the determined software component may be loaded from non-volatile memory of the CPE device to volatile memory of the CPE device. The software component may be loaded from non-volatile memory (e.g., non-volatile component directory 215 of FIG. 2) to volatile memory (e.g., volatile memory component cache 220 of FIG. 2), for example, by the software component load module 210. In embodiments, the software component load module 210 can direct the loading of the software component into volatile memory from non-volatile memory, and the CPE device may execute the software component from the volatile memory at 520.

Figure 6:
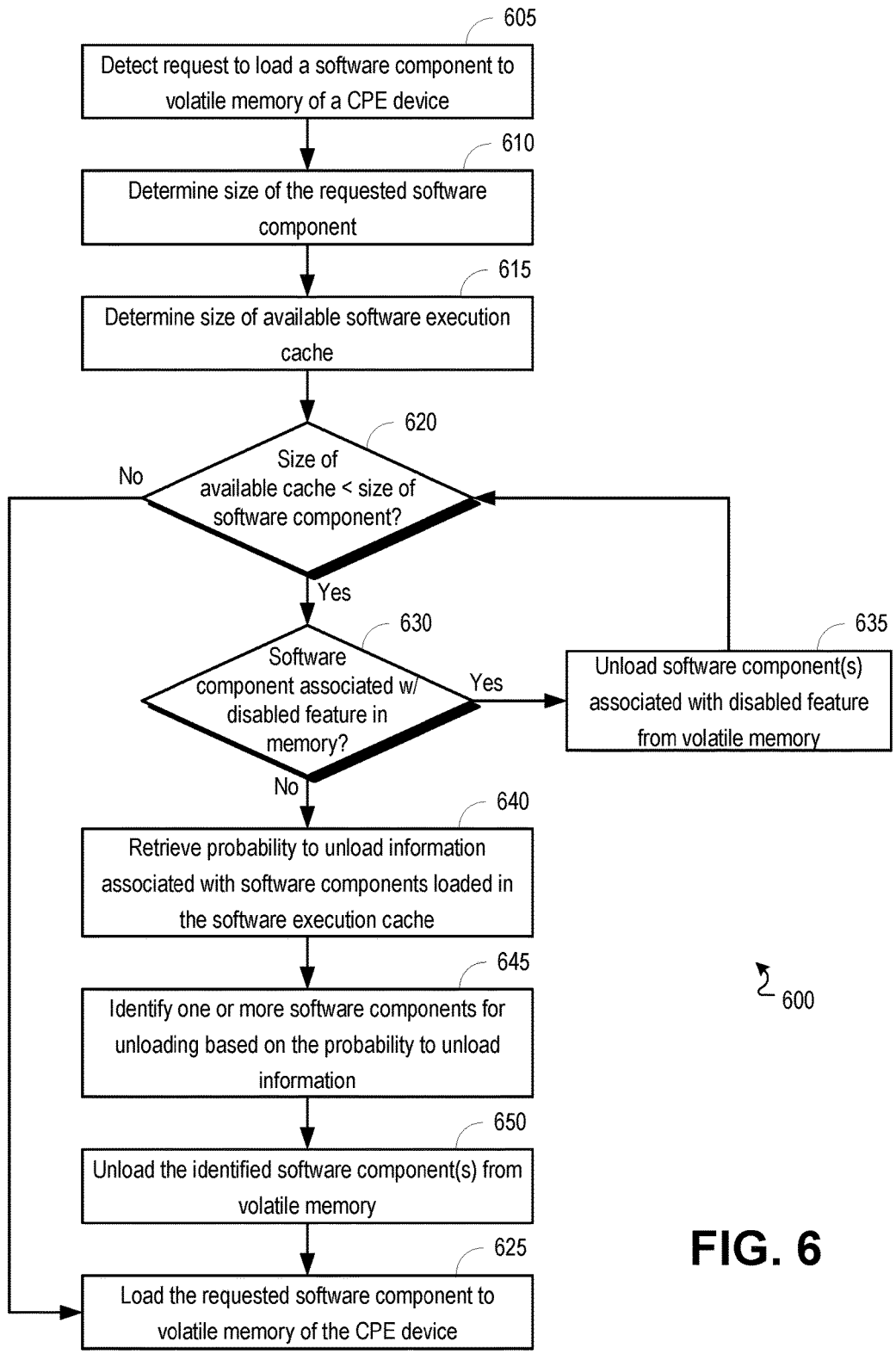
FIG. 6 is a flowchart illustrating an example process operable to facilitate the dynamic unloading of software components from volatile memory of a customer premise equipment device.

FIG. 6 is a flowchart illustrating an example process 600 operable to facilitate the dynamic unloading of software components from volatile memory of a CPE device. The process 600 can begin at 605 when a request to load a software component to volatile memory of a CPE device (e.g., CPE device 105 of FIG. 1) is detected. The request to load a software component to volatile memory (e.g., volatile memory component cache 220 of FIG. 2) may be detected, for example, by the software component load module 210 of FIG. 2. The request to load the software component may be received in response to a user/device interaction with the CPE device. For example, interactions with the CPE device may include commands received from a user controlling or interfacing with the CPE device, communications received from other devices (e.g., other CPE devices, client devices such as tablets, computers, mobile devices, etc.) through a network connection, and others.

At 610, the size of the requested software component may be determined. The size of the requested software component may be determined, for example, by the software component load module 210 of FIG. 2.

At 615, the size of the available software execution cache may be determined. The size of the available software execution cache may be determined, for example, by the software component load module 210. In embodiments, the available software execution cache (e.g., volatile memory such as volatile memory component cache 220 of FIG. 2) may be based on the maximum size of the software execution cache minus the sizes of all software components that are loaded into the software execution cache.

At 620, a determination may be made whether the size of the available software execution cache is less than the size of the requested software component. The determination whether the size of the available software execution cache is less than the size of the requested software component may be made, for example, by the software component load module 210. In embodiments, the software component load module 210 may compare the size of the available software execution cache (e.g., volatile memory) to the size of the requested software component.

If, at 620, the determination is made that the size of the available software execution cache is not less than the size of the requested software component, the process 600 may proceed to 625. At 625, the requested software component may be loaded into volatile memory (e.g., software execution cache) of the CPE device. For example, the requested software component may be loaded into the volatile memory component cache 220 of FIG. 2 directly from a download server (e.g., download server 120 of FIG. 1), or the requested software component may be loaded into the volatile memory component cache 220 from non-volatile memory (e.g., non-volatile component directory 215 of FIG. 2). Once the software component is loaded into volatile memory, the CPE device may execute the software component from volatile memory.

If, at 620, the determination is made that the size of the available software execution cache is less than the size of the requested software component, the process 600 may proceed to 630. At 630, a determination may be made whether a software component loaded in volatile memory of the CPE device is associated with a feature that is disabled at the CPE device. The determination may be made, for example, by the software component load module 210.

If, at 630, the determination is made that a software component loaded in volatile memory of the CPE device is associated with a feature that is disabled at the CPE device, the process 600 may proceed to 635. At 635, the one or more software components associated with a disabled feature may be removed from volatile memory. For example, the software component load module 210 may remove the one or more software components from volatile memory (e.g., volatile memory component cache 220). In embodiments, the one or more software components may be removed from volatile memory and added to non-volatile memory (e.g., non-volatile component directory 215 of FIG. 2) of the CPE device. After the one or more software components are removed from volatile memory, the process 600 may return to 620, where a determination may be made whether the size of the available software execution cache is less than the size of the requested software component.

If, at 630, the determination is made that a software component loaded in volatile memory of the CPE device is not associated with a feature that is disabled at the CPE device, the process 600 may proceed to 640. At 640, probability to unload information associated with software components loaded in the software execution cache may be retrieved. The probability to unload information may be retrieved, for example, by the software component load module 210. In embodiments, the software component load module 210 may determine a probability to unload value for each software component that is currently loaded in volatile memory (e.g., volatile memory component cache 220). In determining the probability to unload value for a software component, the volatile memory component cache 220 may consider the size of available software execution cache (e.g., volatile memory), current network bandwidth, and one or more criteria associated with the software component including a frequency at which the software component is executed, time required by the software component to begin executing, size of the software component, time since the software component was last requested/loaded, and/or others.

At 645, one or more software components may be identified for unloading from volatile memory based on the probability to unload information. The one or more software components may be identified for unloading, for example, by the software component load module 210. In embodiments, the software component load module 210 may use the probability to unload values of the currently loaded software components to determine which software component(s) should be unloaded from volatile memory. For example, the software component load module 210 may identify, for unloading, one or more software components that have the highest probability to unload values relative to other software components that are loaded in volatile memory. The software component load module 210 may identify a number of software components for unloading such that sufficient space is created in volatile memory to allow the requested software component to be loaded into volatile memory. It should be understood, that the software component load module 210 may be configured in various ways to dynamically consider and weigh the different criteria used in the calculation of the probability to unload values for the different software components.

At 650, the one or more identified software components (i.e., the one or more software components identified at 645) may be removed from volatile memory. For example, the software component load module 210 may remove the one or more identified software components from volatile memory (e.g., volatile memory component cache 220). In embodiments, the one or more software components may be removed from volatile memory and added to non-volatile memory (e.g., non-volatile component directory 215 of FIG. 2) of the CPE device. After the one or more identified software components are removed from volatile memory, the requested software component may be loaded to volatile memory of the CPE device at 625.

Figure 7:
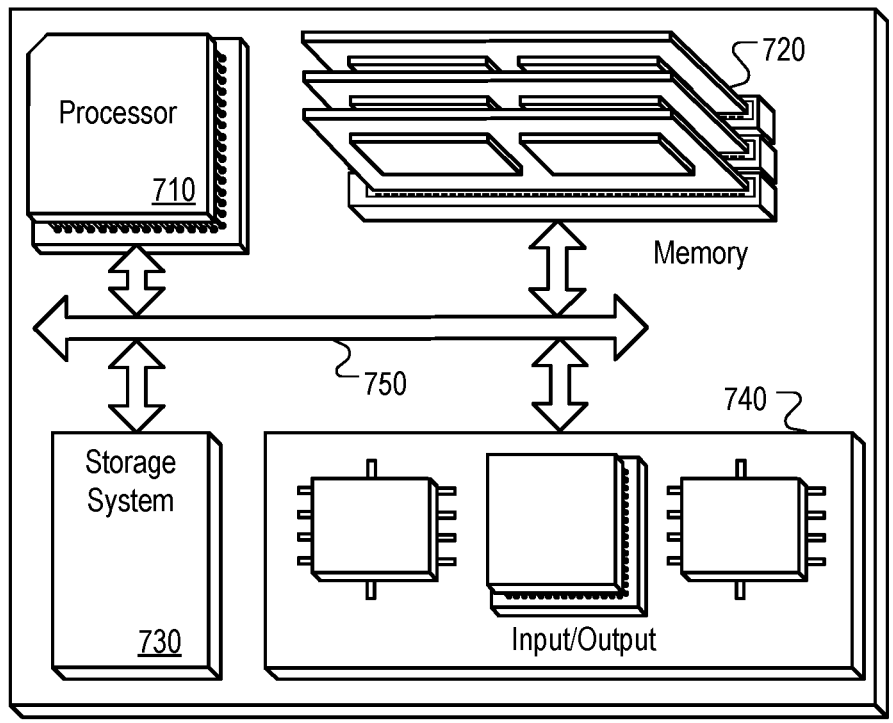
FIG. 7 is a block diagram of a hardware configuration operable to facilitate the dynamic management of the software load at a customer premise equipment device.

FIG. 7 is a block diagram of a hardware configuration 700 operable to facilitate the dynamic management of the software load at a customer premise equipment device. The hardware configuration 700 can include a processor 710, a memory 720, a storage device 730, and an input/output device 740. Each of the components 710, 720, 730, and 740 can, for example, be interconnected using a system bus 750. The processor 710 can be capable of processing instructions for execution within the hardware configuration 700. In one implementation, the processor 710 can be a single-threaded processor. In another implementation, the processor 710 can be a multi-threaded processor. The processor 710 can be capable of processing instructions stored in the memory 720 or on the storage device 730.

The memory 720 can store information within the hardware configuration 700. In one implementation, the memory 720 can be a computer-readable medium. In one implementation, the memory 720 can be a volatile memory unit. In another implementation, the memory 720 can be a non-volatile memory unit.

In some implementations, the storage device 730 can be capable of providing mass storage for the hardware configuration 700. In one implementation, the storage device 730 can be a computer-readable medium. In various different implementations, the storage device 730 can, for example, include a hard disk device, an optical disk device, flash memory or some other large capacity storage device. In other implementations, the storage device 730 can be a device external to the hardware configuration 700.

The input/output device 740 provides input/output operations for the hardware configuration 700. In embodiments, the input/output device 740 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video, voice, data, and/or other services to a device (e.g., television, computer, tablet, mobile device, STB, access point, etc.). In embodiments, the input/output device can include driver devices configured to send communications to, and receive communications from one or more networks (e.g., access network 110 of FIG. 1, WAN 115 of FIG. 1, etc.).

Those skilled in the art will appreciate that the invention improves upon methods and systems for loading and unloading software components to and from volatile memory. Methods, systems, and computer readable media can be operable to facilitate the dynamic management of the software load at a customer premise equipment device. Software components may be dynamically loaded into volatile memory of a customer premise equipment (CPE) device from a download server or non-volatile memory of the CPE device when an interaction with the CPE device creates a request for the software components. The CPE device may be configured to dynamically unload software components from volatile memory to create space for an incoming software component. The CPE device may identify one or more software components to be removed from volatile memory based upon a calculated probability to unload value for the software components within volatile memory, wherein the probability to unload value for each of the software components is calculated based upon one or more criteria associated with each software component.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   detecting a request to load a requested executable software component to volatile memory;
   determining that the size of the requested executable software component is greater than the size of available space in the volatile memory;
   determining a probability to unload value for each executable software component of one or more executable software components currently loaded in the volatile memory, wherein the probability to unload value for each respective one executable software component is calculated based upon one or more criteria associated with an execution of the respective one executable software component;
   based upon the probability to unload values determined for each of the one or more executable software components that are currently loaded in the volatile memory, identifying one or more of the executable software components for removal from the volatile memory;
   removing the identified one or more executable software components from the volatile memory; and
   loading the requested executable software component to the volatile memory.

2. The method of claim 1, wherein the requested executable software component is loaded into the volatile memory from non-volatile memory.

3. The method of claim 1, wherein the requested executable software component is loaded into the volatile memory from a download server.

4. The method of claim 1, further comprising:
   before identifying one or more of the executable software components for removal from the volatile memory based upon the probability to unload values, removing one or more executable software components associated with a disabled feature from the volatile memory.

5. The method of claim 1, further comprising:
   determining an amount of available network bandwidth, wherein the available network bandwidth is used in the identification of the one or more executable software components for removal from the volatile memory.

6. The method of claim 1, wherein the one or more executable software components identified for removal from the volatile memory comprise one or more executable software components having the highest probability to unload values relative to the probability to unload values of the other executable software components loaded in the volatile memory.

7. The method of claim 1, wherein the requested executable software component is loaded into the volatile memory from non-volatile memory when a required latency associated with the requested executable software component is less than a threshold latency, and wherein the requested executable software component is loaded into the volatile memory from a download server when the required latency associated with the requested executable software component is greater than the threshold latency.

8. The method of claim 1, wherein the one or more criteria associated with the respective one executable software component is downloaded as part of a software component database comprising one or more criteria associated with each of one or more software components.

9. The method of claim 8, wherein one or more of the criteria within the software component database is periodically updated.

10. An apparatus comprising one or more modules configured to:
    detect a request to load a requested executable software component to volatile memory;
    determine that the size of the requested executable software component is greater than the size of available space in the volatile memory;
    determine a probability to unload value for each executable software component of one or more executable software components currently loaded in the volatile memory, wherein the probability to unload value for each respective one executable software component is calculated based upon one or more criteria associated with an execution of the respective one executable software component;

based upon the probability to unload values determined for each of the one or more executable software components that are currently loaded in the volatile memory, identify one or more of the executable software components for removal from the volatile memory;

remove the identified one or more executable software components from the volatile memory; and load the requested executable software component to the volatile memory.

11. The apparatus of claim 10, wherein the requested executable software component is loaded into the volatile memory from non-volatile memory.

12. The apparatus of claim 10, wherein the requested executable software component is loaded into the volatile memory from a download server.

13. The apparatus of claim 10, wherein the one or more executable software components identified for removal from the volatile memory comprise one or more executable software components having the highest probability to unload values relative to the probability to unload values of the other executable software components loaded in the volatile memory.

14. One or more non-transitory computer readable media having instructions operable to cause one or more processors to perform the operations comprising:

detecting a request to load a requested executable software component to volatile memory;

determining that the size of the requested executable software component is greater than the size of available space in the volatile memory;

determining a probability to unload value for each executable software component of one or more executable software components currently loaded in the volatile memory, wherein the probability to unload value for each respective one executable software component is calculated based upon one or more criteria associated with an execution of the respective one executable software component;

based upon the probability to unload values determined for each of the one or more executable software components that are currently loaded in the volatile memory, identifying one or more of the executable software components for removal from the volatile memory;

removing the identified one or more executable software components from the volatile memory; and loading the requested executable software component to the volatile memory.

15. The one or more non-transitory computer-readable media of claim 14, wherein the requested executable software component is loaded into the volatile memory from non-volatile memory.

16. The one or more non-transitory computer-readable media of claim 14, wherein the requested executable software component is loaded into the volatile memory from a download server.

17. The one or more non-transitory computer-readable media of claim 14, wherein the instructions are further operable to cause the one or more processors to perform the operations comprising:

before identifying one or more of the executable software components for removal from the volatile memory based upon the probability to unload values, removing one or more executable software components associated with a disabled feature from the volatile memory.

18. The one or more non-transitory computer-readable media of claim 14, wherein the instructions are further operable to cause the one or more processors to perform the operations comprising:

determining an amount of available network bandwidth, wherein the available network bandwidth is used in the identification of the one or more executable software components for removal from the volatile memory.

19. The one or more non-transitory computer-readable media of claim 14, wherein the one or more executable software components identified for removal from the volatile memory comprise one or more executable software components having the highest probability to unload values relative to the probability to unload values of the other executable software components loaded in the volatile memory.

20. The one or more non-transitory computer-readable media of claim 14, wherein the requested executable software component is loaded into the volatile memory from non-volatile memory when a required latency associated with the requested executable software component is less than a threshold latency, and wherein the requested executable software component is loaded into the volatile memory from a download server when the required latency associated with the requested executable software component is greater than the threshold latency.

* * * * *